(12) United States Patent
Kauffman et al.

(10) Patent No.: US 7,035,842 B2
(45) Date of Patent: *Apr. 25, 2006

(54) METHOD, SYSTEM, AND PROGRAM FOR DEFINING ASSET QUERIES IN A DIGITAL LIBRARY

(75) Inventors: Steven Victor Kauffman, San Jose, CA (US); Jerry Duaine Robertson, III, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 368 days.

This patent is subject to a terminal disclaimer.

(21) Appl. No.: 10/053,113

(22) Filed: Jan. 17, 2002

(65) Prior Publication Data
US 2003/0135492 A1    Jul. 17, 2003

(51) Int. Cl.
*G06F 17/30* (2006.01)
*G06F 7/00* (2006.01)
(52) U.S. Cl. .................... 707/3; 707/104.1
(58) Field of Classification Search .......... 707/1, 707/104.1, 100, 101, 203, 103; 715/500.1; 709/226; 717/103
See application file for complete search history.

(56) References Cited

U.S. PATENT DOCUMENTS

| | | | |
|---|---|---|---|
| 5,701,453 A | 12/1997 | Maloney et al. | 707/2 |
| 5,764,973 A | 6/1998 | Lunceford et al. | 707/1 |
| 5,787,413 A | 7/1998 | Kauffman et al. | 707/2 |
| 5,857,203 A | 1/1999 | Kauffman et al. | 707/200 |
| 5,893,110 A | 4/1999 | Weber et al. | 707/104.1 |
| 5,920,700 A | 7/1999 | Gordon et al. | 709/226 |
| 5,923,850 A | 7/1999 | Barroux | 709/224 |
| 6,035,303 A | 3/2000 | Baer et al. | 707/103 R |
| 6,233,586 B1 * | 5/2001 | Chang et al. | 707/103 R |
| 6,260,040 B1 | 7/2001 | Kauffman et al. | 707/10 |
| 6,658,429 B1 * | 12/2003 | Dorsett, Jr. | 707/1 |
| 6,745,368 B1 * | 6/2004 | Boucher et al. | 715/500.1 |

OTHER PUBLICATIONS

U.S. Appl. No. 10/053,115, filed Jan. 17, 2002, "Method, System and Program for Defining Asset Classes in a Digital Library," invented by SV Kauffman.
Q304468—ACC97: Defining Relationships Between Tables in a Microsoft Access Database. [online][Retrieved on Nov. 23, 2001]. Retrieved from: http://support.microsoft.com/default.aspx?scid=KB;EN-US;Q304468.

* cited by examiner

*Primary Examiner*—Uyen Le
*Assistant Examiner*—Te Yu Chen
(74) *Attorney, Agent, or Firm*—David W. Victor; Konrad Raynes & Victor LLP

(57) ABSTRACT

Provided are a method, system, and program for defining asset classes in a digital library. At least one asset class is defined to include at least one attribute and attributes are defined for each asset class to have an attribute object type. The attribute object type is defined to indicate one of a plurality of different data structure formats that are searchable through separate application programs, wherein the attribute object types in one asset class are implemented in different data structure formats. A asset object instance is generated for each asset class and information is generated in the asset object instance on a file location of attribute objects providing the attributes for the generated asset object instance.

18 Claims, 11 Drawing Sheets

FIG. 4a

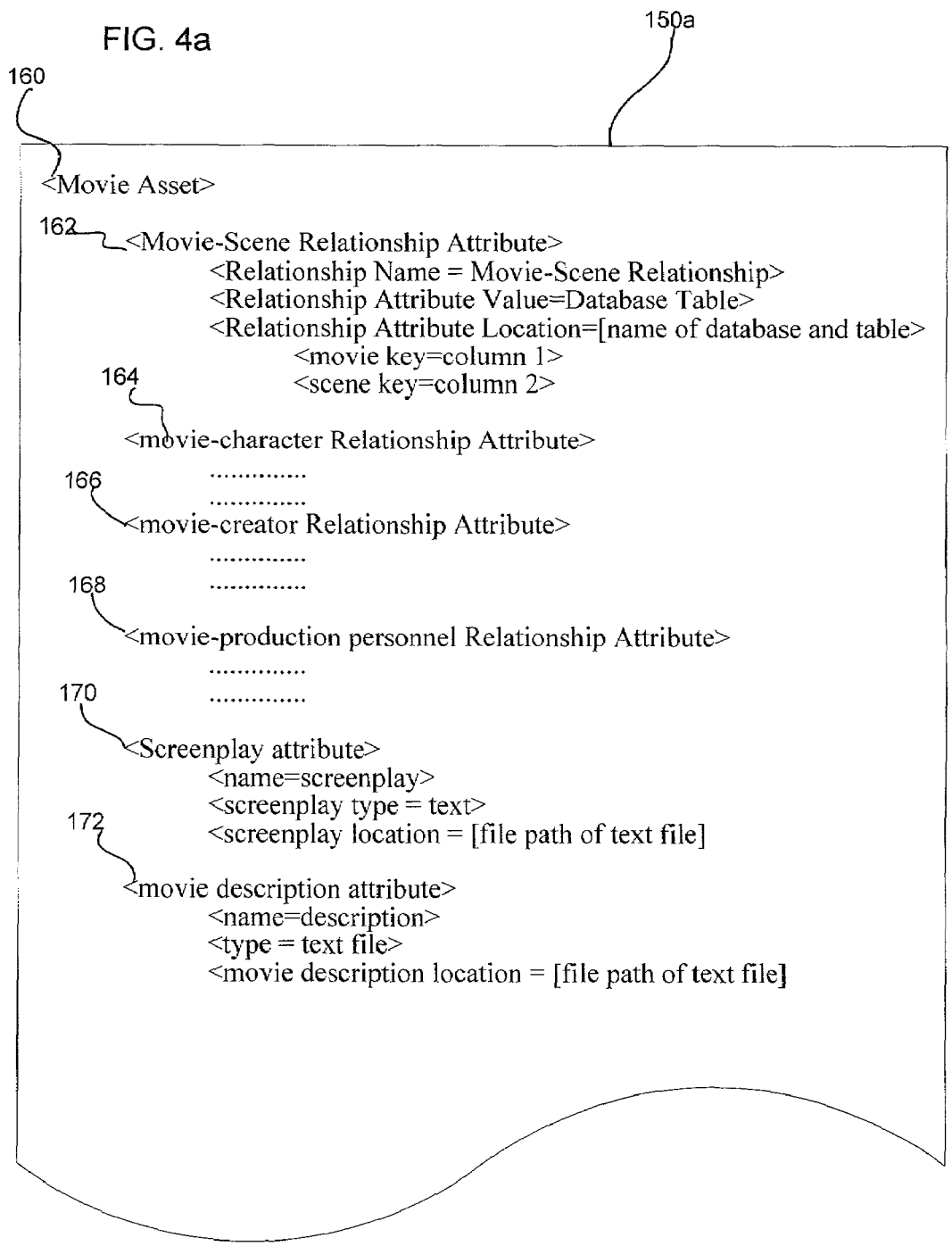

```
<Movie Asset>
    <Movie-Scene Relationship Attribute>
        <Relationship Name = Movie-Scene Relationship>
        <Relationship Attribute Value=Database Table>
        <Relationship Attribute Location=[name of database and table>
            <movie key=column 1>
            <scene key=column 2>

<movie-character Relationship Attribute>
        .............
        .............
    <movie-creator Relationship Attribute>
        .............

<movie-production personnel Relationship Attribute>
        .............

<Screenplay attribute>
        <name=screenplay>
        <screenplay type = text>
        <screenplay location = [file path of text file]

<movie description attribute>
        <name=description>
        <type = text file>
        <movie description location = [file path of text file]
```

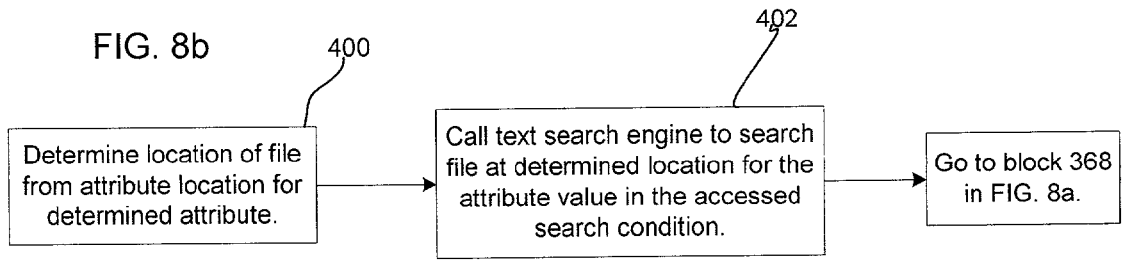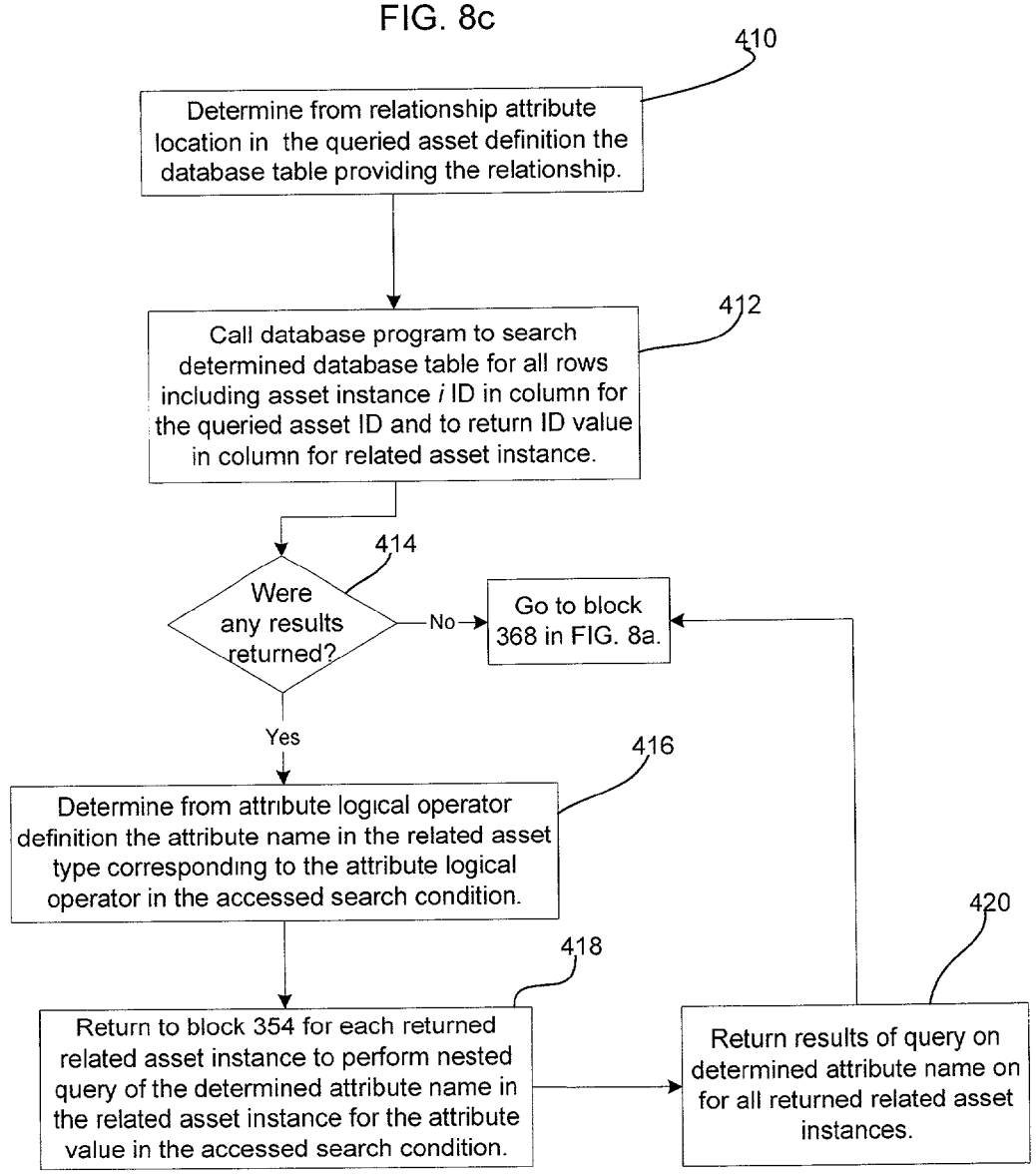

METHOD, SYSTEM, AND PROGRAM FOR DEFINING ASSET QUERIES IN A DIGITAL LIBRARY

RELATED APPLICATIONS

This application is related to the co-pending and commonly assigned patent application entitled "Method, System, and Program for Defining Asset Classes in a Digital Library", having 10/053,115, which patent application is filed on the same date herewith and incorporated herein by reference in its entirety.

BACKGROUND OF THE INVENTION

1. Field of the Invention

The present invention relates to a method, system, and program for defining asset classes in a digital library.

2. Description of the Related Art

In current relational database art, data is organized into logical arrangements, such that an instance of an object type having various attributes comprises a record or row in a table for the object type and each attribute of the object type instance is stored in a column of the table in that row for the object type instance. A relational database also allows for relationships between tables, such that an attribute for an object type in one table may map to an object type maintained in another table. For instance, a sales table may have as an attribute a store location. A separate store location table may have as attributes for each store location information on that store, such as address, manager, etc. In this way, the store table maintains information that may be found in many of the records in the sales table.

Relational databases are very useful when the objects have well defined and static relationships with their attributes. However, for certain types of data and libraries, the type of information stored with an object type may be constantly changing and the relationship an object type has with other object types may also be constantly evolving. Moreover, multiple variations of any object type may be created as the object evolves. Using a traditional relational database scheme would require constantly reconfiguring the current set of tables and their relationships. Further, any queries would also have to be modified to search any additional columns in existing tables or new tables that are added.

For these reasons, there is a need in the art to provide improved techniques for managing the storage and relationship of data in a digital library.

SUMMARY OF THE PREFERRED EMBODIMENTS

Provided are a method, system, and program for querying instances of asset classes in a digital library. At least one asset class is provided having at least one attribute, wherein each attribute is defined to have an attribute object type. Asset object instances are provided for each asset class. A query is provided indicating an asset name, search predicate, at least one attribute operator, and attribute value. The attribute operator is associated with at least one attribute included in the indicated asset name. The query is processed by accessing asset object instances of the asset name to determine asset object instances whose attribute object for the attribute associated with the attribute operator matches the attribute value and satisfies the search predicate.

In further implementations, the query includes multiple attribute operators and attribute values to query asset object instances whose attribute objects match the attribute values and search predicate for each attribute operator.

Still further, each asset object instance may include information on a file location of attribute objects providing the attributes for the asset object instance. In such implementations, processing the query to search the attribute object further comprises accessing the attribute object at the file location indicated in the asset object instance having the attribute object.

Yet further, an attribute for each asset may be defined to have an attribute object type indicating one of a plurality of different data structure formats that are searchable through separate application programs. In such implementations, processing the query to search the attribute object further comprises determining from the object type for the attribute associated with the attribute operator one application program capable of accessing the attribute object type. The determined application program is called to determine whether the attribute object for the asset object instance includes the attribute value in the query.

The described implementations provide a technique for implementing a query for digital libraries having asset classes and attributes for asset classes when the defined attributes for the asset classes have different data structure formats. The described implementations allow for asset classes to be defined with different data structures to accommodate different types of data.

BRIEF DESCRIPTION OF THE DRAWINGS

Referring now to the drawings in which like reference numbers represent corresponding parts throughout:

FIGS. 4a, 4b, and 4c provide an example of an arrangement of asset classes defined for a film production environment in accordance with implementations of the invention;

FIGS. 8a and 8b illustrate logic to perform a query in accordance with implementations of the invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
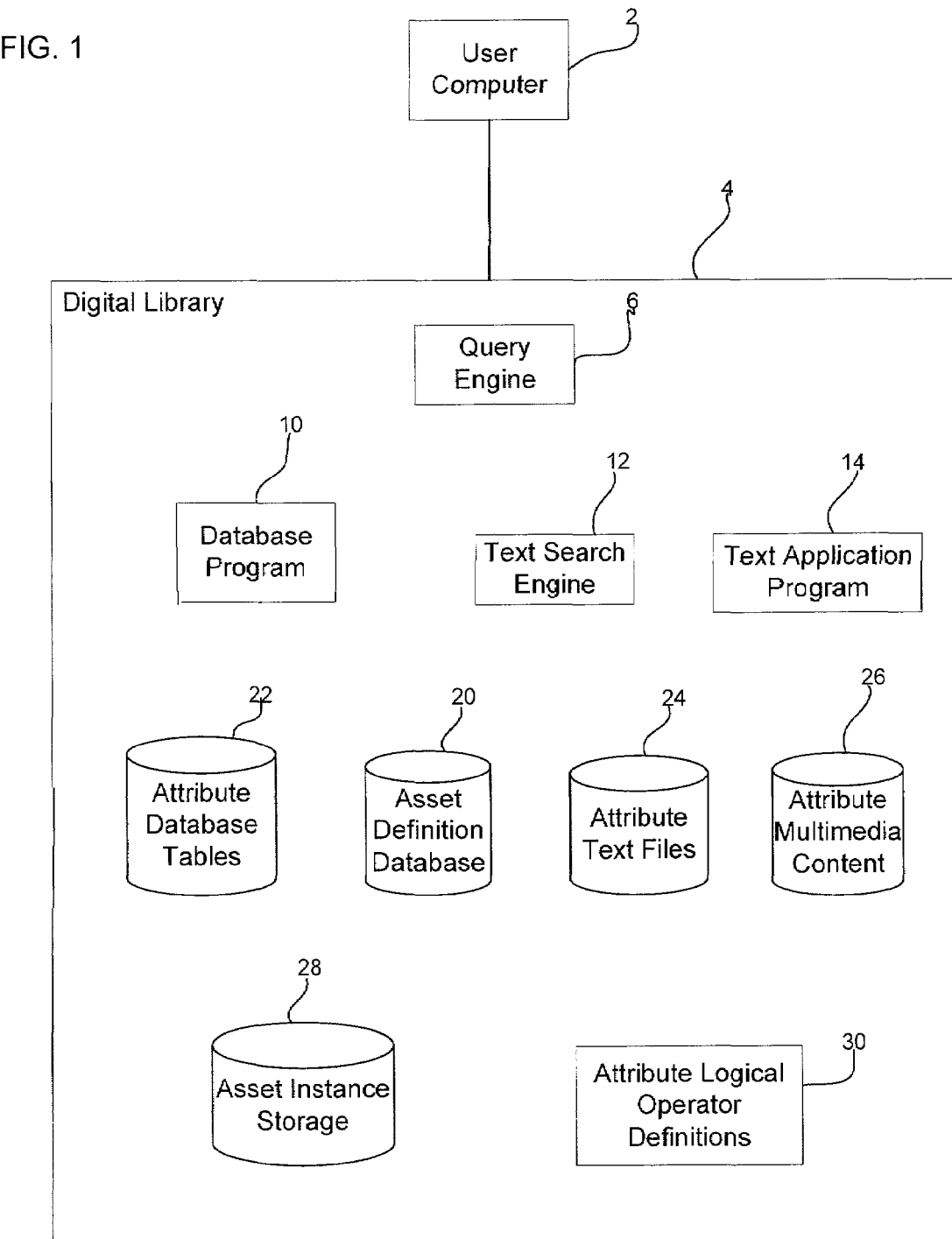
FIG. 1 illustrates a digital library architecture in accordance with implementations of the invention.

FIG. 1 illustrates a computing environment in which aspects of the invention are implemented. A user computer 2 is in communication with a digital library 4. The digital library 4 includes a query engine 6 that manages data access operations in the digital library 4. The query engine 6 would utilize a database program 10 and a text search engine 12 and text application program 14 to access and manipulate data in database tables and text files, respectively. The database program 10 may comprise any database program known in the art, e.g., International Business Machines Corporation's (IBM) DB2*, Oracle 8 Server, etc.** The text search engine 12 and text application program 14 may comprise any text program known in the art, such as application tools for a structured document, e.g., an Extensible Markup Language (XML) document, Hypertext Markup Language (HTML) document, or other type of text documents, such as ASCII files, etc.

The digital library 4 maintains information about asset classes, where each asset class defines a type of information having a set of attributes for which information may be provided. An asset definition database 20 provides a definition of the asset classes maintained in the digital library 4, including the attributes of the asset class as well as the physical locations in the digital library 4 where the attribute information may be maintained. Attribute data may be maintained in attribute database tables 22 accessible through the database program 8 and attribute text files 24 accessible through the text search engine 12 and text application program 14. Attribute data may also include attribute multimedia content 26, such as images, motion pictures, sound files, etc. The asset data components 20, 22, 24, and 26 may be stored in a single storage system or device or distributed across different storage devices and systems.

The query engine 6, database program 10, text search engine 12, and text application program 14 may execute in a single computer device or execute on different computer systems, where the computer systems on which the components may comprise a server, workstation, mainframe, desktop, laptop or any other computational device known in the art. The user computers 2 may comprise any computing device known in the art, such as workstations, servers, desktops, laptops, hand held computers, telephony devices etc. The user computers 2 communicate data access requests to the query engine 6 in the digital library 4. The user computers 2 may include client software (not shown) to enable communication and interfacing with the query engine 6.

The defined asset classes may be part of a schema, where each class defined in the schema has various attributes. The asset definition database 20 maintains information on the attributes defined for each asset class. The digital library 4 maintains instances of defined asset classes in asset instance storage 28. Each instance of an asset class comprises an asset object that includes information for the attributes defined for the asset class in the asset definition database 20. The instances of an asset class include information on the different attributes defined for the asset class, where the information for each attribute identifies an attribute object, such as data in a database table, text file, multimedia file. The information for the instance of the asset class may be maintained in a database record or file, such as an XML file.

Figure 2:
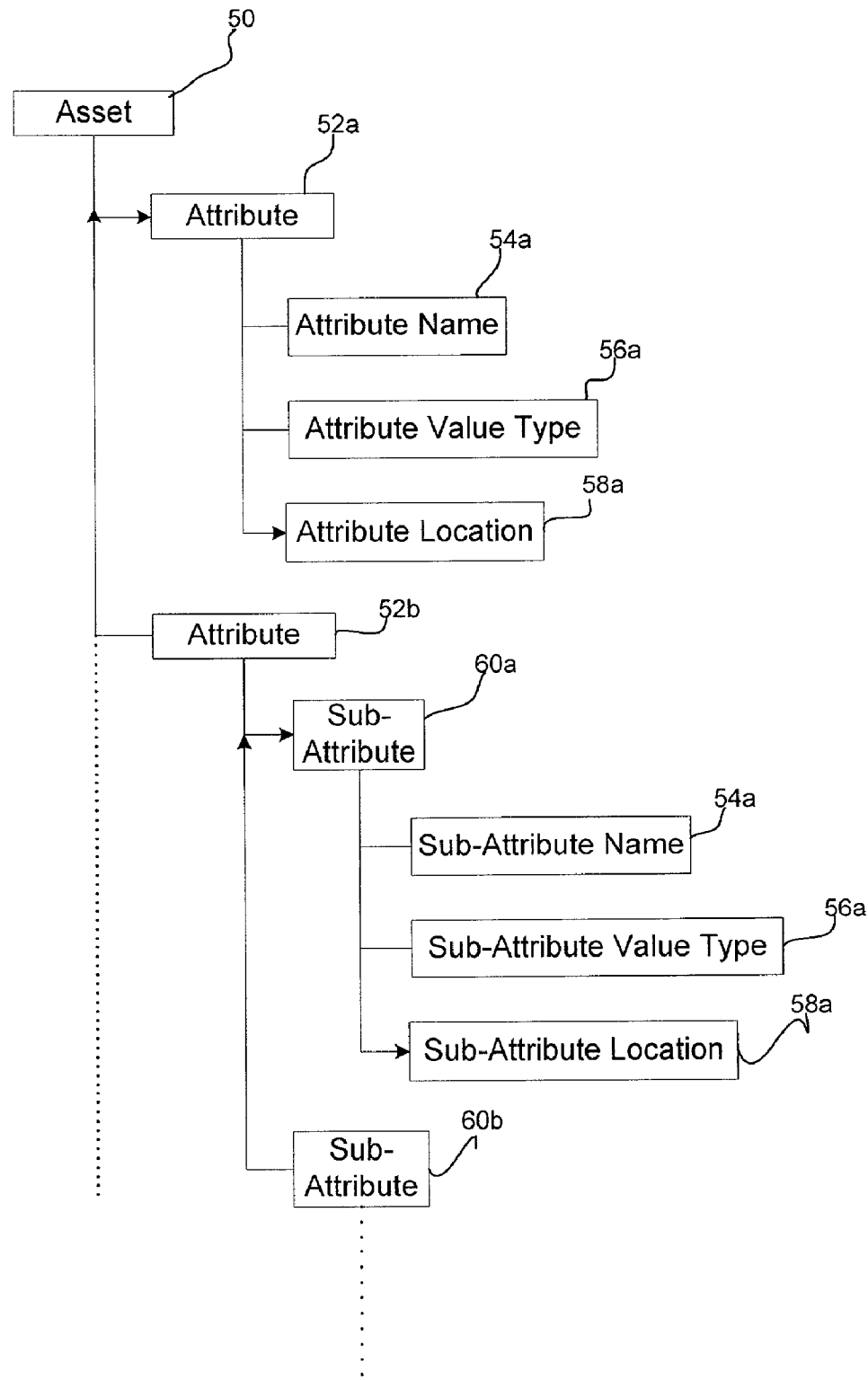
FIGS. 2 and 3 illustrate a relationship between an asset and attributes and attribute values defined for the asset in accordance with implementations of the invention.

FIG. 2 illustrates an example of the data structure of the definition of one asset class maintained in the asset definition database 20. An asset 50 has one or more attributes 52a and 52b providing information on the asset class 50 that would be inherited by each instance of the asset class 50. An attribute 52a would have an attribute name 54a, an attribute value type 56a (e.g., text, integer, large object, image, movie, etc.), and an attribute location 58a. The attribute value may comprise data in an external data object, such as a text file in the text file database 24, cells in one or more attribute database tables 22, or a multimedia file within the attribute multimedia content 26. If the attribute value is included in the text files 24 or comprises multimedia content in the attribute multimedia content 26 store, then the attribute location 58a would identify the device, directory, and file name of the file including the attribute value. Alternatively, if the attribute value is maintained in a database table 22, then the attribute location 58a may identify the database table name and column(s) including the attribute value. Additionally, the attribute value, which may comprise some data string, may be embedded within the instance of the asset object. Yet further, the instance of the asset object may also maintain files or other data structures that comprise the attribute value.

With respect to FIG. 2, an attribute of an asset 50, e.g., attribute 58b, may include one or more sub-attributes 60a and 60b that provide the different information components that are used to define the attribute 58b. Each sub-attribute 60a and 60b includes a sub-attribute name 52b, sub-attribute value type 54b and a sub-attribute location 56B.

Figure 3:
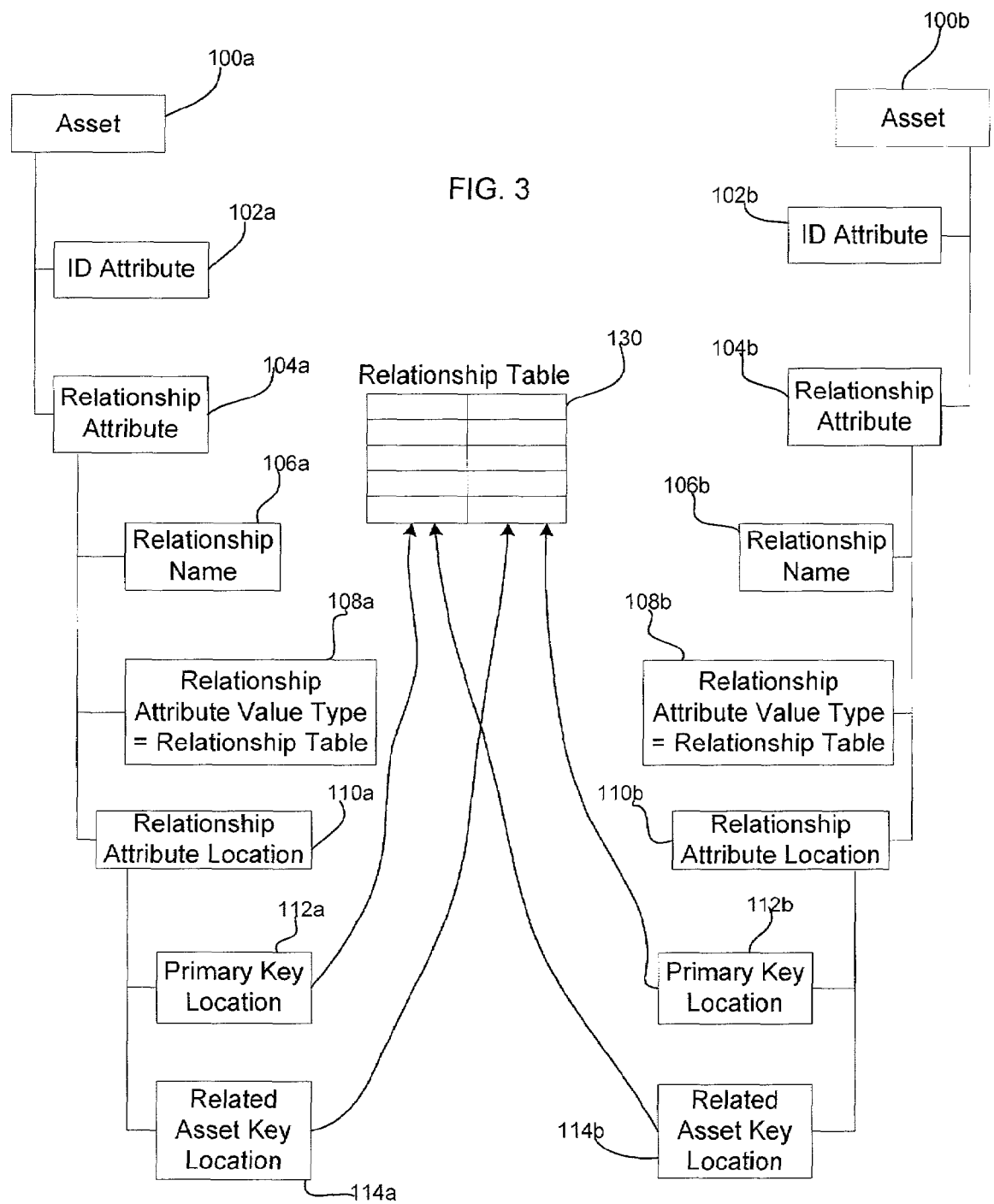

In further implementations, an attribute may comprise a relational attribute. A relational attribute specifies a relationship the asset type has with another asset type. FIG. 3 illustrates how the definition database 20 may indicate a relationship attribute to specify a relationship between two asset types. Two asset definitions 100a and 100b each have a unique identifier (ID) attribute 102a and 102b providing a unique ID for the instance of the asset. Further shown are relationship attributes 104a and 104b. (The asset types 100a and 100b may also include any number of additional attributes and/or relationship attributes specifying relationships with other asset types.) Each relationship attribute 104a and 104b includes a relationship name 106a and 106b, which may include descriptive information on the related asset, a relationship attribute value type 108a and 108b, and a relationship attribute location 110a and 110b. The relationship attribute value type 108a and 108b may comprise a two column relationship table 130, where the first column provides the unique identifier of an instance of one related asset type and the second column provides the unique identifier of an instance of the other related asset type. In this way, the relationship attribute value allows for identification of a many-to-many relationship between instances of the two asset types 100a and 100b. The relationship attribute location 110a and 110b includes two values, a primary key location 112a and 112b indicating the column in the relationship table 130 including the identifier of the asset instance and a related key location indicating the column in the relationship table 130 of the identifier of the related asset instance. Each row in the relationship table 130 provides a relationship between one instance of each asset 100a and 100b.

In the described implementations, each instance of an asset type is capable of having attribute objects providing the attributes stored at different locations and within different data structures. In this way the attribute objects or values for an asset instance may comprise columns in different database tables, text files, multimedia content, etc. An information manager of the digital library 4 can extend any asset instance to provide for a different type of information by adding an attribute to the asset type and specifying a location of the new attribute value. In this way, any type of data in any type of electronic format can be added to the asset type without affecting the data structures storing other attribute values or requiring reconfiguration of such data structures. Further, with the described implementations, a single database can be used to store attributes for different asset types. For instance, different asset types may have a common attribute. In such case, the different asset types may maintain attribute values in a common table for such attribute.

The asset definition database 20 may be implemented in an XML file, where each asset type comprises an element tag, each attribute of the asset type comprises a sub-element tag of the asset type element tag, and the attribute name, attribute value type, and attribute location comprise attribute tags having attribute values embedded therein. If, as shown in FIG. 2, an attribute 52b has sub-attributes 60a, 60b, then each sub-attribute 60a and 60b comprises a further subelement tag having sub-attribute tags 54a, 56a, and 56b within sub-attribute values embedded therein. Alternatively, the asset definition database 20 may further be implemented in a relational database table.

Similarly, as discussed, each asset instance may, which includes information on the attribute objects providing attributes for the asset instance, may be implemented in an XML file, where the tagged elements provide the attribute information for that specific asset instance. Alternatively, the asset instances, or asset instance objects, may be stored as database records, where fields in the record provide the information for the attribute objects of the asset instance, or within any other data structure known in the art.

Figure 4B:
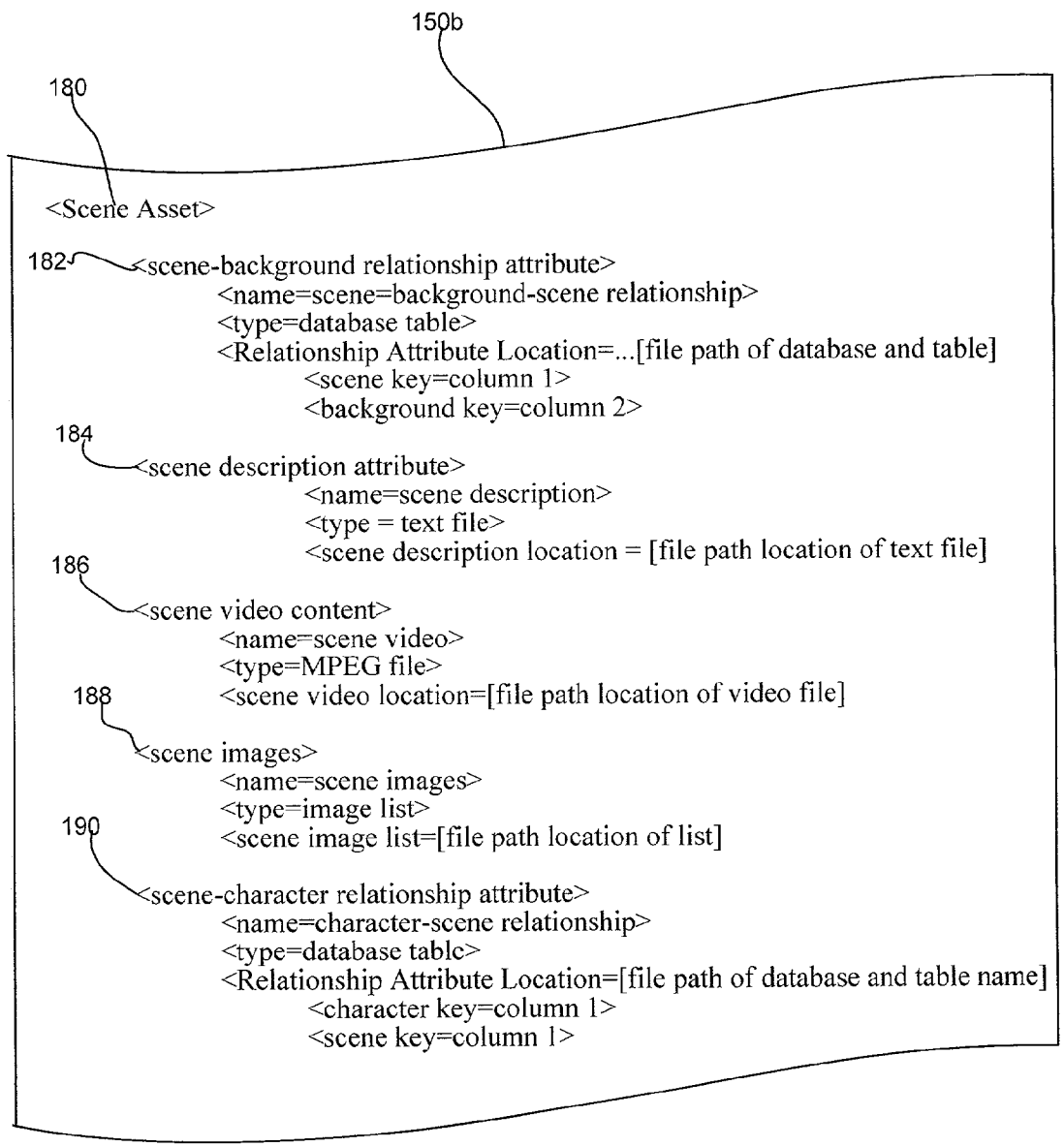
Figure 4C:
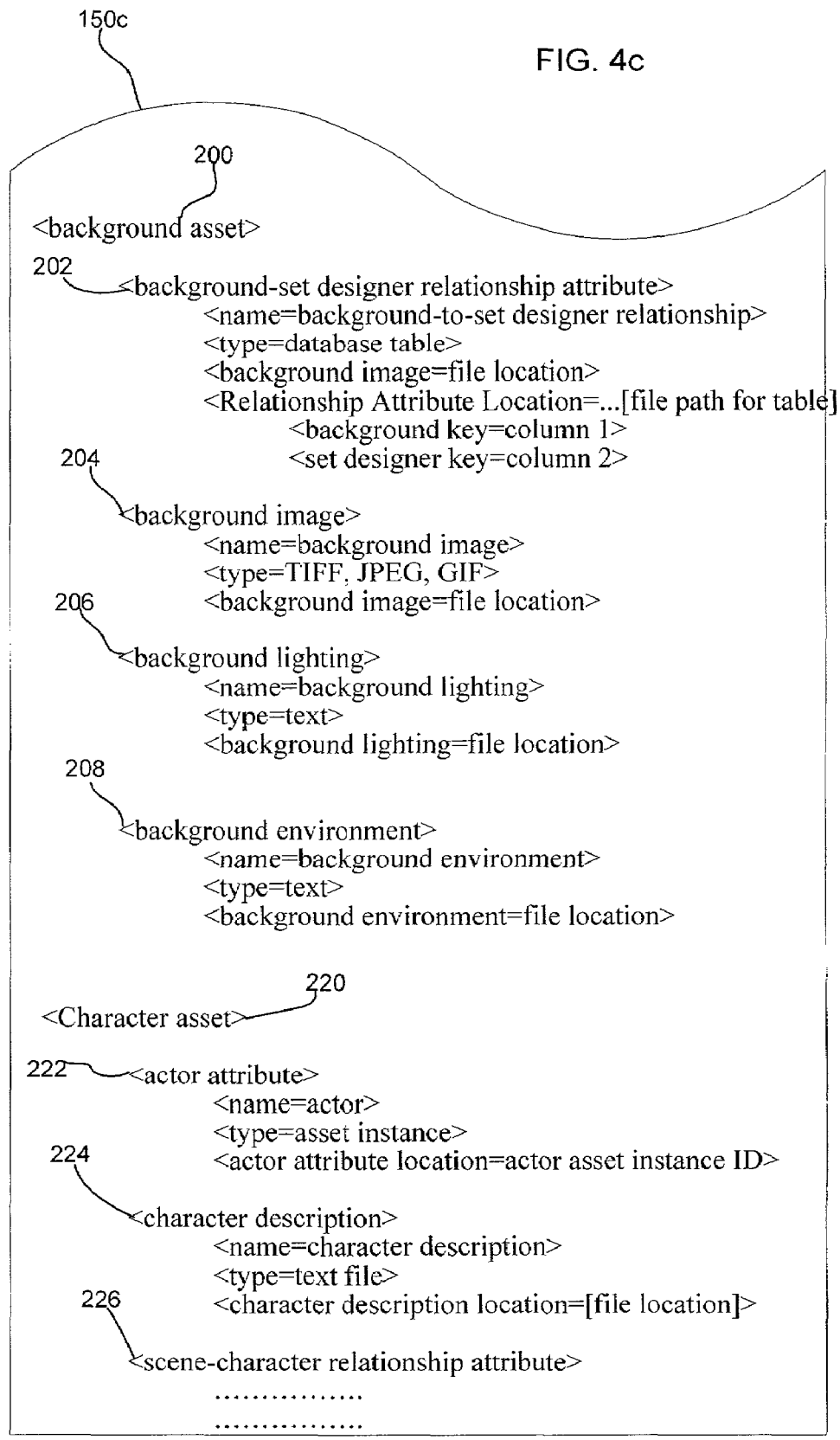

One example of how the digital library implementation described herein may be utilized to describe content having complicated interrelationships is provided with respect to a digital library 4 maintaining information on a film production project. FIGS. 4a, 4b, and 4c illustrate an asset definition database for use in film production whose asset class descriptions are implemented within a file including tagged elements, where the asset definition database is shown in three parts 150a, 150b, and 150c in FIGS. 4a, 4b, and 4c, respectively. In the part of the definition 150a, a movie asset class 160 is defined. Each instance of the movie asset class 160 would be instantiated for a particular movie. The movie asset class defines the following attributes:

movie-scene relationship attribute 162: comprises a database table or other data structure that associates the movie with one or more scene asset instances providing information on scenes in the movie.

movie-character relationship attribute 164: comprises a database table or other data structure that associates the movie with one or more characters that appear in the movie. The relationship data structure associating movies to characters may comprise a many-to-many relationship because a character can appear in more than one movie.

movie-creator relationship attribute 166: comprises a database table or other data structure that associates the movie with one or more creators, i.e., individuals, that contributed to the artistic content of the movie. This relationship may define a many-to-many relationship as creators may be involved in multiple movies and one movie may have multiple creators.

movie-production personnel relationship attribute 168: comprises a database table or other data structure that associates the movie with one or more production assistants that contributed to the production of the movie. This relationship may define a many-to-many relationship as production personnel may be involved in multiple movies and one movie may have multiple production personnel.

screenplay attribute 170: defines an attribute for an electronic text file including the screenplay for the movie. The screenplay file location indicates the file path location of the electronic text file including the screenplay in a storage device accessible to the digital library 4. Additional screenplay related attributes may also be provided, such as the screenplay writers, etc.

movie description attribute 172: defines an attribute for an electronic text file including descriptive information about the movie, including the file path where the description file is located.

As discussed, each movie asset instance is associated through the movie-scene relationship attribute 162 with one or more scene asset instances. The part of the file 150b in FIG. 4b provides the definition of the scene asset class 180 as including the following attributes:

scene-background relationship attribute 182: comprises a database table or other data structure that associates a scene instance with one or more background asset instances. This relationship may define a many-to-many relationship as a scene may have multiple backgrounds and a background instance may be involved in multiple scenes.

scene description attribute 184: defines an attribute for an electronic text file including descriptive information about the scene, including the file path where the description file is located.

scene video content attribute 186: defines a location of a motion picture file in a video file format, such as Motion Picture Expert Group (MPEG), Audio Video Interleave (AVI), Quicktime, etc. If there are multiple versions of the motion picture file for the scene, then a video content attribute instance may be created for each version of the video file. Alternatively, a single scene video content attribute may comprise a list identifying the location of multiple files having video of the scene.

scene images attribute 188: provides a list data structure identifying electronic images of the scene in an image file format, such as Joint Photographic Expert Group (JPEG), Tagged Image File Format (TIFF), etc. The images may comprise electronic files including photographs of the scene or sketched storyboard drawings outlining the scene. The list data structure would include either the image content or a file path location of the image file.

scene-character relationship attribute 190: comprises a database table or other data structure that associates a scene instance with one or more character asset instances that appear in the scene instance. This relationship may define a many-to-many relationship as a scene may have multiple characters and each character can appear in multiple scenes.

As discussed, each scene asset instance is associated with one or more background asset instances through the scene-background relationship attribute 182. The part 150c of the asset definition shown in FIG. 4c includes the definition of the background asset class 200 and the character asset class 220 that provides information on the various files maintained for each asset instance. The background asset class 200 defines the following attributes:

background-set designer relationship attribute 202: comprises a database table or other data structure that associates a background with one or more set designers that are working on the background. This relationship may define a many-to-many relationship as a background may have multiple set designers and each set designer can work on multiple backgrounds. A set designer asset class may be defined to provide information on each set designer.

background image attribute 204: provides a file path location of an image file including a sketch (e.g., storyboard) or photograph of the background. Alternatively, the image attribute may provide a list including references to multiple image files including images of the background.

background lighting attribute 206: defines an attribute providing information on the lighting used in the background, may point to a text file describing the lighting used for the background instance or the lighting information may be embedded in the attribute value within the instance of the background asset object.

background environment attribute 208: defines an attribute providing information on the environment of the background, may point to a text file describing the lighting used for the background instance or the environment information may be embedded in the attribute value in the instance of the background asset object. The environment information may describe environmental factors impacting the background instance, such as weather, natural disasters, impending events that can effect a background.

As discussed, each scene asset instance may be associated with a character via the scene-character relationship attribute 190. A character asset class 220 defines attributes of a character appearing in scenes of a movie. The character asset class 220 may define the following attributes:

actor attribute 222: provides information on an actor that plays the character. The actor attribute may provide a unique identifier of an actor asset instance, where there is an actor asset instance for each actor, providing biographical information and other actor related information.

character description attribute 224: defines a text file providing information on the character. The text file may be at a file location identified in the character description attribute or embedded in the character description attribute within the instance of the character object.

scene-character relationship attribute 226: same as scene character relationship attribute 190 described with respect to the scene asset class 180.

Figure 5:
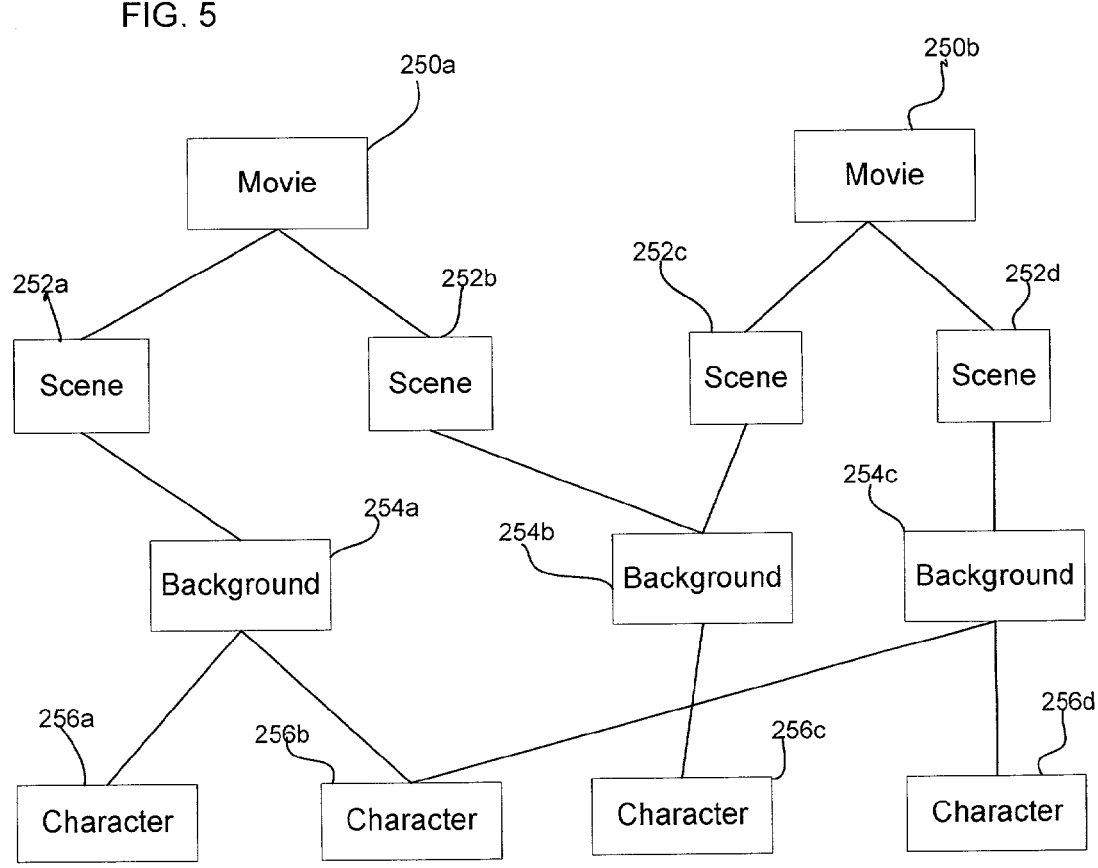
FIG. 5 illustrates how asset instances for a film production digital library may interrelate in accordance with implementations of the invention.

FIG. 5 illustrates an example of how instances 250*a* and 250*b* of the movie asset class 160 relate to different scene asset instances 252*a*, 252*b*, 252*c*, and 252*d*, which in turn relate to different background asset instances 254*a*, 254*b*, 254*c*, and 254*d*, which in turn relate to further character asset instances 256*a*, 256*b*, 256*c*, and 256*d*. With the described implementations, any of the different asset types may interrelate. Further, a user may easily extend the type of information or provide for further relationships for an asset type by adding an attribute to the asset type definition in the asset definition database 20. For instance, the movie instances 250*a* and 250*b* may interrelate with the character instances 256*a*, 256*b*, 256*c*, and 256*d*. This addition does not require any additional reconfiguration or alteration of any other defined attributes or the data structures including the content or data for the attributes. For instance, if an information manager wanted to add an additional attribute for the character asset type 220 for a different actor that portrays the character at a different stage in life, e.g., childhood, old age, etc., then the information manager may add a character child attribute including sub-attributes on the name of the actor, character description, etc., for the character at that age. Such modifications do not require any reconfiguration of the data structures including information already existing for the character assets. Further, if an artist generates content in a new media or stored at a different location, then the information manager may add an attribute to the asset type to associate the data at this new media or location with the character asset type. In this way, the information for an asset class instance may be distributed in different files and different data structures, e.g., text files, database files, XML files, multimedia files, etc.

The digital library 4 (FIG. 1) may include a user interface to allow an information manager to review the asset types and their attributes defined in the asset definition database 20, and add any additional attributes for additional attribute information or new data being provided for that particular asset class. The user interface may further be used to allow the user to add an instance for a particular asset as well as define the attribute values for the attributes for the added asset class instance.

Queries in the Digital Library

Figure 6:
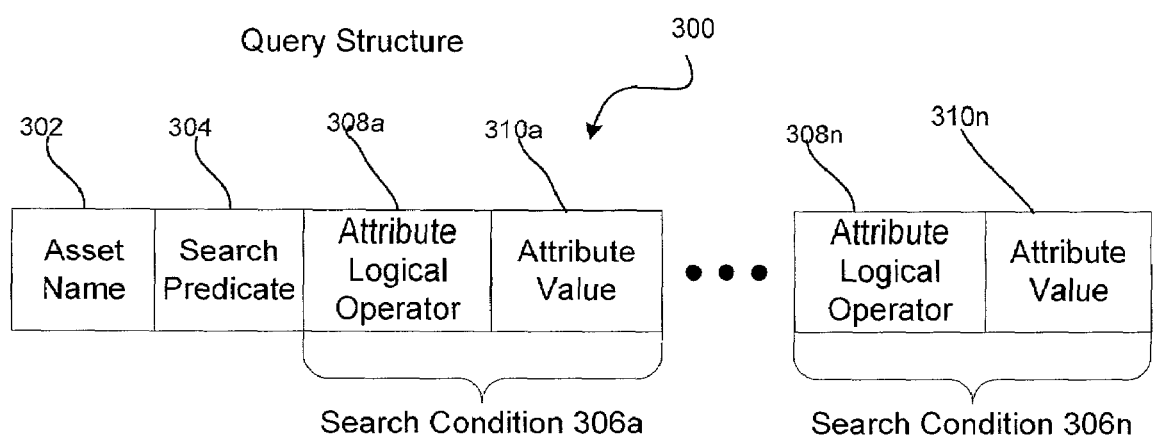
FIG. 6 illustrates a query structure in accordance with implementations of the invention.

Described implementations further provide a query format to allow for queries of the assets instances. FIG. 6 illustrates the fields included within the query structure 300 that is processed by the query engine 6. The query structure 300 includes:

asset name 302: provides a name of the asset whose instances will be searched.

search predicate 304: specifies a predicate to determine whether a queried attribute qualifies, e.g., "contains", "does not include", etc.

search criteria 306*a* . . . 306*n*: specifies the search condition, where each search criteria 306*a* . . . 306*n* is comprised of an attribute logical operator and attribute value component.

attribute logical operator 308*a* . . . 308*n*: specifies an attribute logical operator identifying an attribute or property to be searched for the specified asset name 302.

attribute value 310*a* . . . 310*n*: species one or more values to use in the search of the attribute indicated by the attribute logical operator 308*a* . . . 308*n*.

As mentioned, the attribute logical operators 308*a* . . . 308*n* are associated with one defined attribute in the queried asset type to indicate the attribute checked for the search condition. If the attribute logical operator is associated with a relationship attribute in one asset type, then the attribute logical operator would be additionally associated with an attribute in the related asset type, to allow for searching of attributes between related asset types. This means that an attribute logical operator defined for a relationship attribute will specify the attribute in the related asset type that is searched to determine if the related asset type instance satisfies the query condition. As shown in FIG. 1, the digital library 4 may maintain an attribute logical operator definition table 30 that defines the attributes associated with an attribute logical operator for the asset types with which the attribute logical operator may be used. When adding asset types to the asset definition database 20, the information manager would have to further add attribute logical operator definitions to the attribute logical operator definition table 30 to define the attributes in the added asset type associated with the added logical operator. If the attribute associated with an added logical operator is a relationship attribute, then the information manager would have to further associate an attribute in the related asset type with the added logical operator to allow for searching of the related asset type on the logical operator. The attribute logical operator may have a name that is descriptive of the type of attribute or value searched to improve ease of use for users constructing queries.

In alternative implementations, there may be no attribute logical operator, and instead the attribute name may be provided in the query in place of the attribute logical operator. If the attribute name is a relationship attribute, then the corresponding attribute in the related asset type would have to have the same name.

Figure 7:
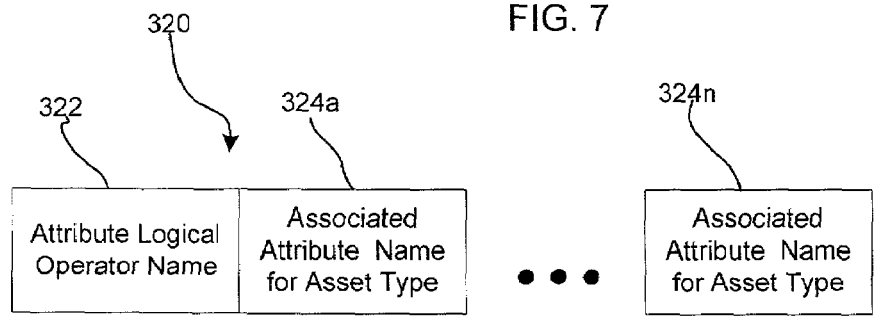
FIG. 7 illustrates how attribute names for different asset types may be associated with a logical operator.

FIG. 7 illustrates an entry 320 in the attribute logical operator definition table 30 as including an attribute logical operator name 322 that is used in the query and one or more associated attribute names for asset types 324a . . . 324n. As discussed, associated attribute names for multiple asset types are provided to allow for searching between related asset types specified in a relationship attribute.

Figure 8A:
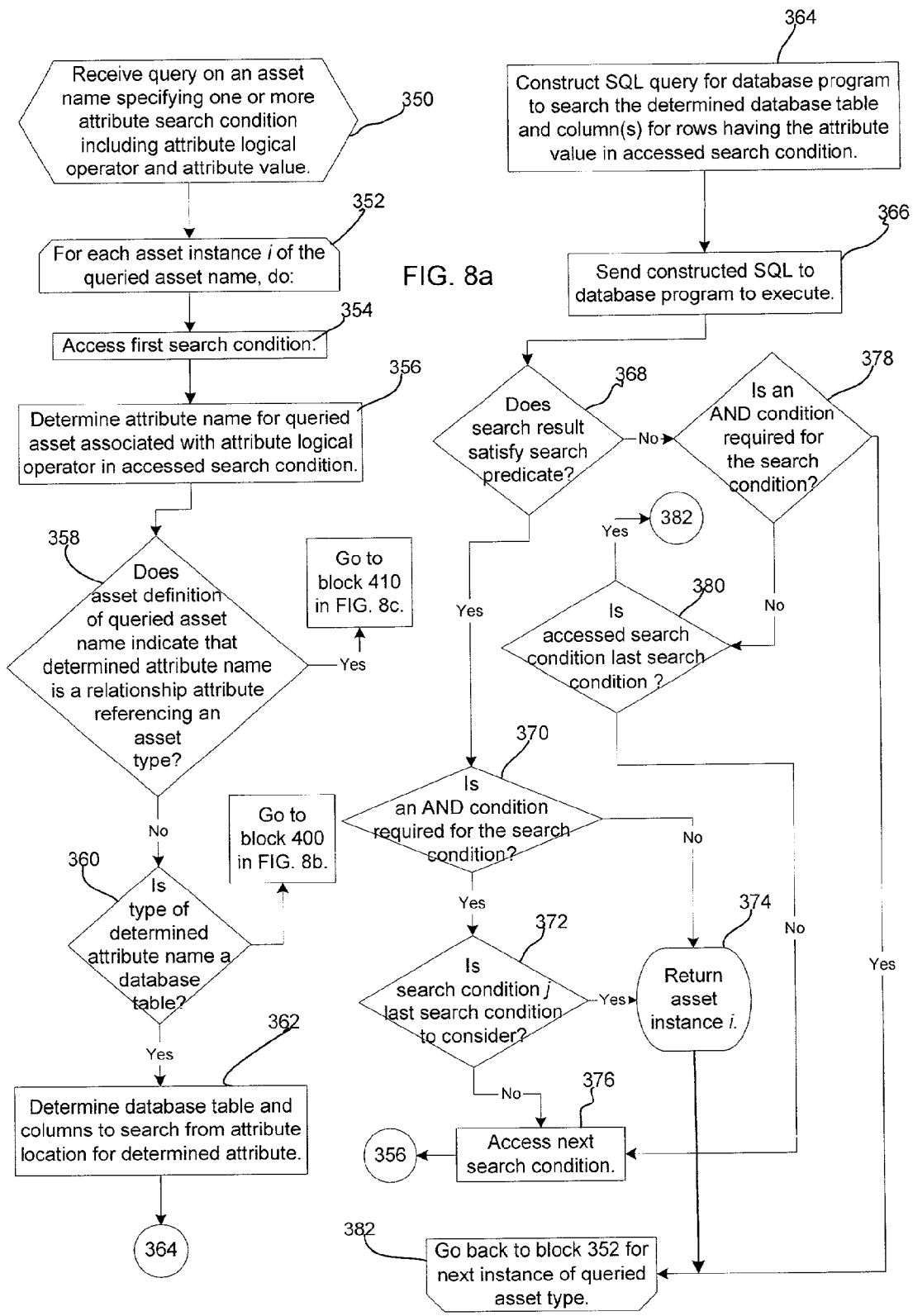

FIGS. 8a and 8b illustrate logic implemented in the query engine 6 to perform query operations. With respect to FIG. 8a, a query is received (at block 350), having the query structure 300 shown in FIG. 6, including an asset name 302, search predicate 304, and multiple search conditions 306a . . . 306n, each including one attribute logical operator 308a . . . . 308n and one attribute value 310a . . . 310n. In certain implementations, the query engine 6 may utilize Application Program Interface (API) calls to communicate queries, to the database program 10 (such as structured language queries (SQL)) and the text search engine 12. For instance, to communicate with the database program 10, the query engine 6 may utilize Open DataBase Connectivity (ODBC) calls if the database program 10 supports ODBC. The query engine 6 then performs a set of operations from blocks 352 through 382 to query each instance i of the specified asset to determine asset instances that satisfy the search conditions. At block 356, the query engine 6 accesses the first search condition 306a and determines (at block 358) the attribute name for the queried asset type 324a . . . 324n that is associated with the attribute logical operator name 308a. If (at block 358) the asset definition of the queried asset name indicates that the determined attribute name is not a relationship attribute referencing an asset type and if (at block 360) the determined attribute name is a database table, then the query engine 6 determines (at block 362) the database table and columns to search for the determined attribute from the attribute location 58a (FIG. 2) of the asset instance i.

Upon determining the database table and columns to query from the attribute location 58a field of the asset instance i, the query engine 6 constructs (at block 364) an SQL query for the database program 10 to search the determined database table and columns(s) for rows having the attribute value 310a . . . 31 On specified in the accessed search condition 306a . . . 306n. The query engine 6 then sends the constructed SQL statement to the database program 10 to execute. This search would determine whether the asset instance i has an attribute value for the searched attribute that satisfies the search condition 306a . . . 306n. The query engine 6 then determines (at block 368) whether the result of the query issued at block 366 satisfies the search predicate 304. The search predicate 304 specifies a logical condition to test the result of the query at block 366. For instance, if the search predicate 304 is "hasObject", then if the query at block 366 determines that the searched attribute satisfies the attribute value 310a . . . 310n, then the query returns that asset instance i. If the search predicate 304 is "doesNotHaveObject", then if the query at block 366 determines that the searched attribute does not satisfy the attribute value 310a . . . 31 On, then the query returns that asset instance i.

If (at block 368) the search result satisfies the search predicate 304 and if (at block 370) the accessed search condition 306a . . . 306n is subject to an AND condition with respect to other search conditions and if (at block 372) the accessed search condition is the last search condition to consider, then the query engine 6 returns (at block 374) asset instance i as satisfying all the search conditions 306a . . . 306n (as discussed there may be one or more search conditions.) Otherwise, if (at block 372) there are further search conditions to consider, then the query engine 6 accesses (at block 376) the next search condition 306b . . . 306n and returns to block 356 to apply the next search condition to the attribute for the queried asset name associated with the attribute logical operator in the next accessed search condition. If (at block 370), an AND condition is not specified for the search condition 306a . . . 306n, i.e., the condition is an OR, then the query engine 6 returns (at block 374) the asset instance i as satisfying the accessed search condition.

If (at block 368) the search result on the determined attribute does not satisfy the search predicate and if (at block 378) there is an AND condition required for the search, then the asset instance i does not satisfy the search conditions 306a . . . 306n and control proceeds (at block 382) back to block 352 to consider the next instance of the queried asset type. If (at block 378) the condition between the search conditions 306a . . . 306n is not an AND condition, i.e., an OR condition, and if (at block 380) the accessed search criteria is not the last, then control proceeds to block 276 to consider whether the asset instance i satisfies the next search criteria condition 306a . . . 306n. Otherwise, if the accessed search condition 306a . . . . 306n is the last, then control proceeds to block 382 to consider any further asset instances.

If (at block 360) the attribute value type is not a database table, then control proceeds to block 400 in FIG. 8b to determine the location of the file from the attribute location (e.g., field 58a in FIG. 2) for the determined attribute. The query engine 6 then calls (at block 402) the text search engine 12 to search the file at the determined location for the attribute value 310a . . . 310n in the accessed search condition 306a . . . 306n. Upon obtaining the search result, i.e., whether the file of the searched attribute includes the attribute value 310a . . . 310n, then control proceeds back to block 368 to determine whether the search result satisfies the search predicate 304 provided with the query.

If (at block 358 in FIG. 8a) the asset definition of the queried asset name indicates that the determined attribute name is a relationship attribute referencing an asset type, then control proceeds to block 410 in FIG. 8c where the query engine 6 determines from the relationship attribute location (e.g., the field 110a, 110b in FIG. 3) the database table 130 (FIG. 3) providing the relationship. The query engine 6 then calls (at block 412) the database program 10 to search the determined relationship database table for all rows including the asset instance i identifier (ID) in the column having the queried asset ID, i.e., the primary key location 112a, 112b, to return the identifier (ID) in the column of the determined row for the related asset instance, i.e., the value in the related asset key location 114a, 114b. If results are returned, then the query engine 6 determines (at block 416) from the attribute logical operator definitions 30 the attribute name in the related asset type corresponding to the attribute logical operator 308a . . . 308n in the accessed search condition 306a . . . 306n. The query engine 6 then returns (at block 418) to block 352 to perform a nested query to determine whether the attribute of the related asset satisfies the attribute value. The query steps from 352 are performed on each returned related asset instance to query the determined attribute name in the related asset instance for the attribute value 310a . . . 310n in the accessed search condition 306a . . . 306n. In this way, the attributes of an asset type related to the attribute of the queried asset instance are searched to determine whether the queried asset instance i satisfies the search condition. This search on the attributes of the related asset instance comprises a JOIN operation on the two asset types. The results of the query on the attribute of the related asset instances are returned at block 420 and control proceeds to block 368 in FIG. 8a to apply the search predicate 304 to determine whether to return the queried asset instance i. Note that the query on the related instance may involve still further recursive queries if the determined attribute name to query in the related asset instance is a relationship attribute.

Fort instance, with respect to the film production assets defined in FIGS. 4a, 4b, and 4c, the following query (1) below can be issued:

Background.hasObject.setDesignedBy="Bob Smith"  (1)

In the above query (1), "Background" is the asset name 302, "hasObject" is the search predicate 304, "setDesignedBy" is the attribute logic operator 308a . . . 308n, and "Bob Smith" is the attribute value 310a . . . 310n. Query (1) searches for all background asset instances having a set designer attribute that is "Bob Smith". As shown in FIG. 4c, the set designer attribute is a relationship attribute 202. Thus, a relationship table associating backgrounds with set designers would be searched to locate whether the currently considered scene instance corresponds to set designer asset instances, and whether the attribute in the set designer asset instance corresponding to the "setDesignedBy" attribute logical operator has a value equal to "Bob Smith". If so, then that scene asset instance is returned as satisfying the query, i.e., having "Bob Smith" as a set designer.

An example of another query (2) is:

Scene.hasObject.descriptionIncludes="shootout"

This query (2) would search the scene descriptions for those scenes whose descriptions include the word "shootout". Because the scene description attribute 184 (FIG. 4b) is a text file, the query engine 6 would call the text search engine 10 to search the scene description file specified at the scene description location field in the scene asset instance being considered.

Figure 9:
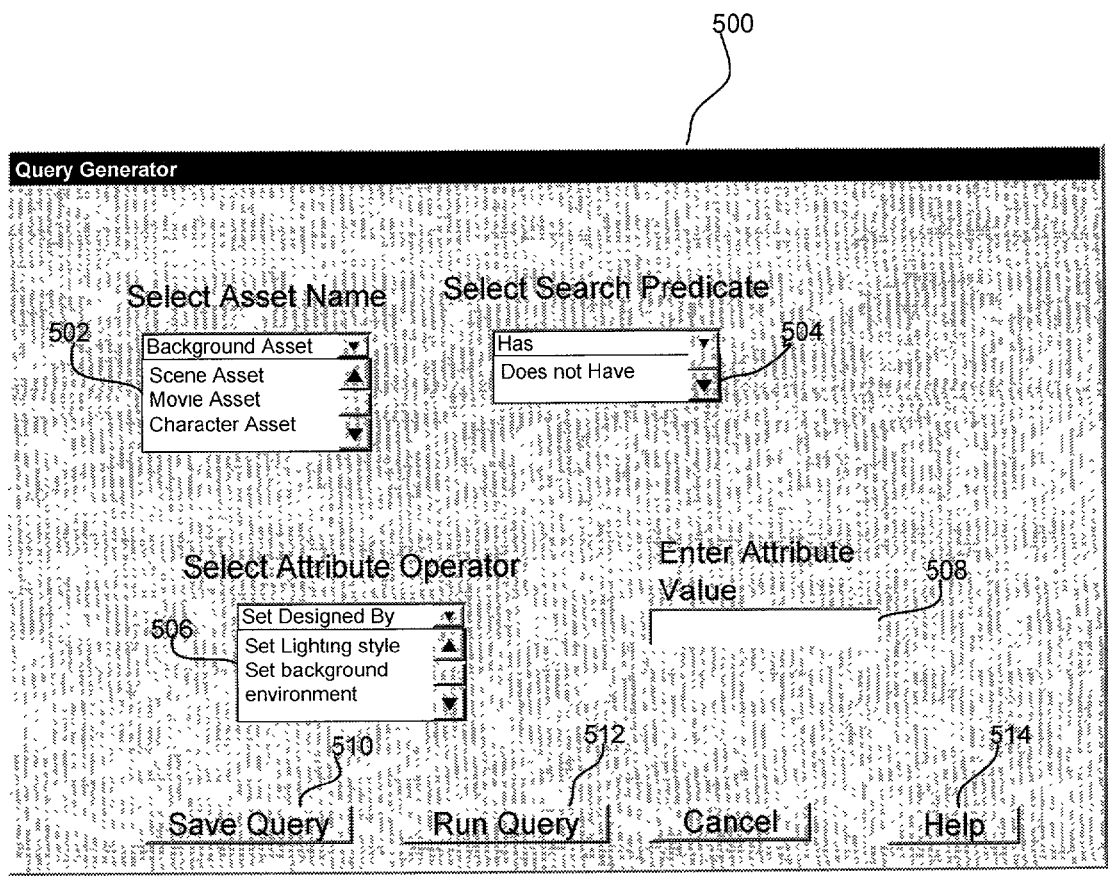
FIG. 9 illustrates a graphical user interface for generating a query in accordance with implementations of the invention.

In further implementations, a graphical user interface (GUI) may be provided to allow the user to generate queries using natural language statements. FIG. 9 illustrates an example of a GUI interface 500 through which the information manager may construct an asset query. An asset drop down box 502 displays all the asset names defined in the asset definition database 20, which in the film production example includes movie asset, scene asset, background asset, and character asset. A search predicate drop down menu 504 displays the search predicates providing the query relationship, e.g., has, does not have, equal to, etc. An attribute logical operator drop down menu 506 displays all the attribute logical operators that have an associated attribute 324a . . . 324n for the asset type selected in the asset name menu 504. The query engine 6 or component generating the query generator display 500 would have to search the attribute logical operator definitions 30 for those attribute logical operators having an associated attribute name for the selected asset type. Alternatively, the user may first select an attribute logical operator, and then the selection of the asset name would be limited to those asset names having attributes associated with the selected attribute logical operator. Further displayed is a value entry field 508 in which the query value may be entered. The GUI panel 500 provides access to the possible assets, attributes, predicates, and logical operators in a search to allow an information manager to construct a search using natural language statements.

The information manager may select the "Save Query" button 510 to save the query by providing the query a name to allow the user to recall the query for later searches. The "Run Query" button 512 is selected to execute the query, and the "Help" button 514 may be selected to obtain information on how to construct the query or to access information on specific asset classes, search predicates, attribute logical operators, and the values that may be used. When running the query, the query engine 6 may construct specific query commands to perform the query against the database program 10 and/or text search engine 12. Thus, the user accesses natural language statements to construct the query through the GUI panel 500 and then the query engine 6 would translate those natural language statements into specific code to manipulate the database program 10 and/or text search engine 12 to perform the specific query operations.

The described implementations provide a digital library implementation that allows an asset class to include data stored in different formats at different locations, such as text files and database files. Further, with the described implementations, attribute information can be added to the asset classes defined in the digital library without requiring reconfiguration of the data structures including preexisting attribute information for the asset instances. The described implementations provide techniques for querying such asset classes and the attributes therein to determine asset instances that satisfy the query search conditions.

Additional Implementation Details

The preferred embodiments may be implemented as a method, apparatus or article of manufacture using standard programming and/or engineering techniques to produce software or code. The term "article of manufacture" as used herein refers to code or logic implemented in a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The asset definition database 150a, 150b, and 150c described above provides an example of how classes may be defined to provide information on movies and the components of a movie. Additional asset classes may be provided to define additional components of a film production, and further attributes may be defined for the asset classes described herein.

Asset classes may be maintained in one or more data structures within the asset definition database 20, such as separate XML files. Asset classes that are associated with a same content group may be maintained in a same data structure, e.g., XML file, in the asset definition database 20.

FIGS. 4*a*, 4*b*, and 4*c* provide an example of how the digital library implementation described herein may be extended to a film production library. However, the described digital library implementation may extend to any type of data type or schema, and is not limited to film production digital libraries.

In the described implementations, a file location was provided for each attribute. In further implementations, certain attributes defined for an asset class may include the attribute information directly in the attribute fields of the class instance object and, thus, not require a reference to an external attribute object, such as a file.

In the described implementations, the attribute information was described as maintained in text files and database files. In alternative implementations, the attribute information may be stored in data structure formats other then text files and database files.

FIGS. 8*a* and 8*b* described specific operations occurring in a specific order. However, those skilled in the art will appreciate that the logic described with respect to FIGS. 8*a* and 8*b* may be modified in that steps may be added, consolidated or modified. Further operations described as being performed sequentially may, in certain instances, be performed in parallel.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

IBM, and DB2 are registered trademarks of International Business Machines Corp.

What is claimed is:

1. A method for querying instances of asset classes in a digital library coupled to a graphical user interface, comprising:
    providing at least one asset class having at least one attribute, wherein each attribute is defined to have an attribute object comprising an external data object and attribute object type identifying a type of the attribute object, wherein the attribute object type indicates one of a plurality of different data structure formats searchable through separate application programs, wherein the data structure formats include a multimedia file, a database object accessed through a database application program, and a text object accessed through a text search engine application program;
    providing an asset object for each instance of one asset class and information on a file location of attribute objects providing the attributes for the asset object instance, wherein the asset object includes information for the attributes in the instance of the asset class;
    presenting the graphical use interface including fields for receiving user input from a window having predefined scrollable items for generating a query indicating an asset name, search predicate, at least one attribute operator, and attribute value, wherein the attribute operator is associated with at least one attribute included in the asset object having the indicated asset name; and
    processing the query by:
        determining asset object instances of the indicated asset name having one attribute object for the attribute associated with the attribute operator;
        accessing the attribute object for the attribute associated with the attribute operator at the file location indicated in the determined asset object instance;
        determining from the object type for the attribute associated with the attribute operator one application program for accessing the data structure format of the attribute object type; and
        calling the determined application program to determine whether the accessed attribute object satisfies the search predicate and the attribute value in the query.

2. The method of claim 1, wherein the query includes multiple attribute operators and attribute values to query asset object instances whose attribute objects match the attribute values and search predicate for each attribute operator.

3. The method of claim 1, wherein one attribute comprises a relationship attribute that defines an association of a first and second asset types and a relationship attribute object associating instances of the first and second asset types, wherein the attribute operator for a relationship attribute is associated with one attribute from the first and second asset types, wherein processing the query to search the attribute object for each asset object instance of the first asset type further comprises:
    accessing the relationship attribute object to determine all asset object instances of the second asset type associated with the asset object instance; and
    for each determined asset object instance, processing the query by determining the determined asset object instances of the second asset type whose attribute object for the attribute of the second asset type associated with the attribute operator matches the attribute value and satisfies the search predicate.

4. The method of claim 3, wherein the relationship attribute object comprises a database table, wherein a first column in the database table is for unique identifiers of instances of the first asset type and a second column in the database table is for unique identifiers of instances of the second asset type, wherein a row in the database table identifies one instance of the first asset type identified by the unique identifier in the first column of the row that is associated with one instance of the second asset type identified by the unique identifier in the second column of the row.

5. The method of claim 1, wherein the definition of each attribute for an asset class is implemented in an Extensible Markup Language (XML) document, wherein each defined attribute for an asset class comprises a tagged element in the XML document and wherein information for each attribute is embedded in at least one tagged attribute of the tagged element for the attribute.

6. The method of claim 1, further comprising:
in response to receiving a user entered asset name for the query, determining attribute operators associated with attributes of the asset name;
generating a display of a list of the determined attribute operators; and
receiving user selection of one of the determined attribute operators from the displayed list, wherein the user selected attribute operator is used in the query.

7. A system for querying data, comprising:
a processor;
a digital library including asset classes;
a graphical user interface coupled to the digital library;
a definition of at least one asset class having at least one attribute, wherein each attribute is defined to have an attribute object comprising an external data object and attribute object type identifying a type of the attribute object, wherein the attribute object type indicates one of a plurality of different data structure formats searchable through separate application programs, wherein the data structure formats include a multimedia file, a database object accessed through a database application program, and a text object accessed through a text search engine application program;
an asset object for each instance of one asset class and information on a file location of attribute objects providing the attributes for the asset object instance, wherein the asset object includes information for the attributes in the instance of the asset class; computer implemented code executed by the processor to perform:
i) presenting the graphical user interface including fields for receiving user input from a window having predefined scrollable items for generating a query indicating an asset name, search predicate, at least one attribute operator, and attribute value, wherein the attribute operator is associated with at least one attribute included in the asset object having the indicated asset name; and
(ii) processing the query by:
determining asset object instances of the indicated asset name having one attribute object for the attribute associated with the attribute operator;
accessing the attribute object for the attribute associated with the attribute operator at the file location indicated in the determined asset object instance;
determining from the object type for the attribute associated with the attribute operator one application program for accessing the data structure format of the attribute object type; and
calling the determined application program to determine whether the accessed attribute object satisfies the search predicate and the attribute value in the query.

8. The system of claim 7, wherein the query includes multiple attribute operators and attribute values to query asset object instances whose attribute objects match the attribute values and search predicate for each attribute operator.

9. The system of claim 7, wherein one attribute comprises a relationship attribute that defines an association of a first and second asset types and a relationship attribute object associating instances of the first and second asset types, wherein the attribute operator for a relationship attribute is associated with one attribute from the first and second asset types, wherein the means for processing the query to search the attribute object for each asset object instance of the first asset type performs:
accessing the relationship attribute object to determine all asset object instances of the second asset type associated with the asset object instance; and
for each determined asset object instance, processing the query by determining the determined asset object instances of the second asset type whose attribute object for the attribute of the second asset type associated with the attribute operator matches the attribute value and satisfies the search predicate.

10. The system of claim 9, wherein the relationship attribute object comprises a database table, wherein a first column in the database table is for unique identifiers of instances of the first asset type and a second column in the database table is for unique identifiers of instances of the second asset types wherein a row in the database table identifies one instance of the first asset type identified by the unique identifier in the first column of the row that is associated with one instance of the second asset type identified by the unique identifier in the second column of the row.

11. The system of claim 7, wherein the definition of each attribute for an asset class is implemented in an Extensible Markup Language (XML) document, wherein each defined attribute for an asset class comprises a tagged element in the XML document and wherein information for each attribute is embedded in at least one tagged attribute of the tagged element for the attribute.

12. The system of claim 7, further comprising:
means for determining attribute operators associated with attributes of the asset name in response to receiving a user entered asset name for the query;
means for generating a display of a list of the determined attribute operators; and
means for receiving user selection of one of the determined attribute operators from the displayed list, wherein the user selected attribute operator is used in the query.

13. A computer readable storage medium including code that is executed to query instances of asset classes in a digital library coupled to a graphical user interface, wherein the code causes operations comprising:
providing at least one asset class having at least one attribute, wherein each attribute is defined to have an attribute object comprising an external data object and attribute object type identifying a type of the attribute object, wherein the attribute object type indicates one of a plurality of different data structure formats searchable through separate application programs, wherein the data structure formats include a multimedia file, a database object accessed through a database application program, and a text object accessed through a text search engine application program;
providing an asset object for each instance of one asset class and information on a file location of attribute objects providing the attributes for the asset object instance, wherein the asset object includes information for the attributes in the instance of the asset class;
presenting the graphical user interface including fields for receiving user input from a window having predefined scrollable items for generating a query indicating an asset name, search predicate, at least one attribute operator, and attribute value, wherein the attribute operator is associated with at least one attribute include in the asset object having the indicate asset name; and processing the query by:
- determining asset object instanced of the indicated asset name having one attribute object for the attribute associated with the attribute operator;
- accessing the attribute object fir the attribute associated with the attribute operator at the file location indicated in the determined asset object instance;
- determined form the object type for the attribute associated with the attribute operator one application program for accessing the data structure format of the attribute object type; and
- calling the determined application program to determine whether the accessed attribute object satisfies the search predicate and the attribute value in the query.

14. The computer readable storage medium of claim 13, wherein the query includes multiple attribute operators and attribute values to query asset object instances whose attribute objects match the attribute values and search predicate for each attribute operator.

15. The computer readable storage medium of claim 13, wherein one attribute comprises a relationship attribute that defines an association of a first and second asset types and a relationship attribute object associating instances of the first and second asset types, wherein the attribute operator for a relationship attribute is associated with one attribute from the first and second asset types, wherein processing the query to search the attribute object for each asset object instance of the first asset type further comprises:
- accessing the relationship attribute object to determine all asset object instances of the second asset type associated with the asset object instance; and
- for each determined asset object instance, processing the query by determining the determined asset object instances of the second asset type whose attribute object for the attribute of the second asset type associated with the attribute operator matches the attribute value and satisfies the search predicate.

16. The computer readable storage medium of claim 15, wherein the relationship attribute object comprises a database table, wherein a first column in the database table is for unique identifiers of instances of the first asset type and a second column in the database table is for unique identifiers of instances of the second asset type, wherein a row in the database table identifies one instance of the first asset type identified by the unique identifier in the first column of the row that is associated with one instance of the second asset type identified by the unique identifier in the second column of the row.

17. The computer readable storage medium of claim 13, wherein the definition of each attribute for an asset class is implemented in an Extensible Markup Language (XML) document, wherein each defined attribute for an asset class comprises a tagged element in the XML document and wherein information for each attribute is embedded in at least one tagged attribute of the tagged element for the attribute.

18. The computer readable storage medium of claim 13, further comprising:
- in response to receiving a user entered asset name for the query, determining attribute operators associated with attributes of the asset name;
- generating a display of a list of the determined attribute operators; and
- receiving user selection of one of the determined attribute operators from the displayed list, wherein the user selected attribute operator is used in the query.

* * * * *

UNITED STATES PATENT AND TRADEMARK OFFICE
CERTIFICATE OF CORRECTION

| | |
|---|---|
| PATENT NO. | : 7,035,842 B2 |
| APPLICATION NO. | : 10/053113 |
| DATED | : April 25, 2006 |
| INVENTOR(S) | : Steven Victor Kauffman and Jerry Duaine Robertson, III |

Page 1 of 1

It is certified that error appears in the above-identified patent and that said Letters Patent is hereby corrected as shown below:

<u>Column 15</u>, line 30, after "of the asset class;" insert as new paragraph starting with the word "computer".

<u>Column 17</u>, line 2, delete "instanced" and insert -- instances -- .

Line 5, delete "object fir" and insert -- object for -- .

Line 8, delete "determined form" and insert -- determined from -- .

Signed and Sealed this

First Day of May, 2007

JON W. DUDAS
*Director of the United States Patent and Trademark Office*